(12) United States Patent
Harms et al.

(10) Patent No.: US 11,780,517 B1
(45) Date of Patent: Oct. 10, 2023

(54) UTILITY TRAILER

(71) Applicant: Norstar Holdings LLC, Brookston, TX (US)

(72) Inventors: Abram Loewen Harms, Sumner, TX (US); Jesko Jeff Schmitt Fehr, Chihuahua (MX); Vanessa Alejandra Perez Navarro, Chihuahua (MX)

(73) Assignee: Norstar Holdings LLC, Brookston, TX (US)

( * ) Notice: Subject to any disclaimer, the term of this patent is extended or adjusted under 35 U.S.C. 154(b) by 0 days.

(21) Appl. No.: 17/931,045

(22) Filed: Sep. 9, 2022

(51) Int. Cl.
B62D 63/08 (2006.01)

(52) U.S. Cl.
CPC .................... B62D 63/08 (2013.01)

(58) Field of Classification Search
CPC .... B62D 63/08; B62D 63/061; B62D 63/062; G01G 19/08; B60D 1/54
See application file for complete search history.

(56) References Cited

U.S. PATENT DOCUMENTS

| | | | | |
|---|---|---|---|---|
| 5,249,821 | A * | 10/1993 | Ricketts | B62D 63/061 280/789 |
| 7,073,816 | B1 * | 7/2006 | Larson | B62D 63/062 280/789 |
| 9,932,078 | B1 * | 4/2018 | Nehring | B60P 1/003 |
| 10,000,146 | B2 * | 6/2018 | Vipond | B62D 33/0273 |
| 10,086,740 | B2 * | 10/2018 | Heck | B60P 1/027 |
| 10,131,371 | B2 * | 11/2018 | Camarco | B60R 9/06 |
| 10,207,753 | B2 * | 2/2019 | O'Marra | B60P 1/02 |
| 10,562,577 | B1 * | 2/2020 | Travica | B62D 63/061 |
| 10,618,580 | B2 * | 4/2020 | Kennedy | F02B 63/047 |
| 10,676,144 | B2 * | 6/2020 | Barnes | B62D 63/064 |
| 10,696,504 | B2 * | 6/2020 | Clark | B65G 69/24 |
| 10,752,148 | B2 * | 8/2020 | Selzer | B60P 1/433 |
| 10,752,306 | B2 * | 8/2020 | Nordstrom | B62D 63/061 |
| 10,787,328 | B2 * | 9/2020 | Soule | B65G 69/003 |
| 2004/0123529 | A1 * | 7/2004 | Wiese | E04H 3/28 52/6 |
| 2007/0132209 | A1 * | 6/2007 | Winter | B62D 63/062 280/656 |
| 2011/0163523 | A1 * | 7/2011 | Smith | B60D 1/66 280/763.1 |
| 2014/0015223 | A1 * | 1/2014 | Banwart | B62D 53/0821 280/476.1 |
| 2014/0312593 | A1 * | 10/2014 | Bank | B62D 63/061 280/400 |
| 2020/0346700 | A1 * | 11/2020 | Nordstrom | B60D 1/06 |
| 2021/0114564 | A1 * | 4/2021 | Fischer | B60S 9/04 |

* cited by examiner

*Primary Examiner* — Drew J Brown
*Assistant Examiner* — Timothy Wilhelm

(57) ABSTRACT

A utility trailer includes a deck frame, siderails extending along each side of the deck frame, a front rail extending along a front of the deck frame, and a rear gate/ramp across a rear of the deck frame. Each siderail rotates between an upright position extending away from the respective side the deck frame and a stowed position aligned with and over the deck frame. The front rail rotates between an upright position extending away from the deck frame and a stowed position aligned with the deck frame and over the folded siderails. The rear gate/ramp rotates between an upright position and a lowered position having one end resting on a surface below the utility trailer, and also rotates between the upright position and a stowed position aligned with the deck frame and over the folded siderails.

14 Claims, 15 Drawing Sheets

UTILITY TRAILER

TECHNICAL FIELD

This disclosure relates generally to utility trailers. More specifically, this disclosure relates to a utility trailer with side rails that may be folded inward for transportation.

BACKGROUND

Designed to be towed behind a vehicle such as a pickup truck, utility trailers are frequently used for transporting small equipment such as lawn mowers, construction or landscaping materials, and the like. Utility trailers typically include a bed (or "deck"), front and side rails, and a rear gate/ramp that may be lowered for loading of the trailer and raised during movement of the trailer. These trailers may have single or tandem axles, depending on load capacity. A front jack typically supports the front end of the utility trailer when the trailer not connected to a towing hitch.

Transportation costs are a significant factor in distribution and sales of utility trailers. Because of the structure, a finished trailer ready for use may require transportation as a single unit (e.g., by towing, in the manner of use), which is inefficient. This factor can cause shipment of multiple utility trailers to be difficult and relatively expensive.

SUMMARY

This disclosure provides a utility trailer.

In a first embodiment, a utility trailer includes a deck frame and a trailer frame coupled to a bottom side of the deck frame, the trailer frame configured to couple the deck frame to a trailer hitch. The utility trailer also includes two side frames, each side frame extending along a respective side of the deck frame and a plurality of side frame rotating assemblies coupling the side frames to the respective sides of the deck frame. Each side frame rotating assembly includes side brackets coupled to a side of the deck frame and including a vertical slot and a protrusion with a hole. Each side frame rotating assembly also includes a rotation pin positioned through a post of the side frame and verticals slots in adjacent side brackets, wherein the rotation pin is located at a bottom end of the vertical hole when the side frame is in an upright and unfolded position and the rotation pin is located at a top end of the vertical slot when the side frame can be rotated in a lowered or folded position. Each side frame rotating assembly further includes an off-centered spacer with a through hole offset from a central axis of the off-centered spacer, the off-centered spacer positioned around a bolt through the holes of the adjacent side brackets. The utility trailer further includes a front frame extending along a front side of the deck frame and a plurality of front frame rotating assemblies coupling the front frame to the front side of the deck frame. Each front frame rotating assembly includes front brackets coupled to the front side of the deck frame and including a vertical slot and a protrusion with a hole. Each front frame rotating assembly also includes a rotation pin positioned through a post of the front frame and verticals slots in adjacent front brackets, wherein the rotation pin is located at a bottom end of the vertical hole when the front frame is in an upright and unfolded position and the rotation pin is located at a top end of the vertical slot when the front frame can be rotated in a lowered or folded position. Each front frame rotating assembly further includes an off-centered spacer with a through hole offset from a central axis of the off-centered spacer, the off- centered spacer positioned around a bolt through the holes of the adjacent side brackets. The utility trailer additionally includes a ramp extending along a back side of the deck frame and a plurality of ramp rotation assemblies coupling the ramp to the back side of the deck frame. Each ramp rotation assembly includes a slotted bracket coupled to the deck frame and including a vertical slot. Each ramp rotation assembly also includes a rotation pin coupled to a bottom end of the ramp and inserted through the vertical slot, wherein the rotation pin is located at a bottom of the vertical slot to be in an upright or unfolded position and also for lowering the ramp to the ground for loading and unloading the utility trailer and the rotation pin is located a top of the vertical slot to be rotated to a lowered or folded position. Each ramp rotation assembly further includes a locking pin extending through a post of the ramp, the locking pin configured to be inserted into a hole of the side frame to lock the ramp in the upright or unfolded position and be inserted into a hole of a bracket coupled to a side of the deck frame. The utility trailer also includes a support panel coupled to an end of the deck frame and including a cutout configured to limit rotation of the side frame when changing to the upright or unfolded position, wherein the support panel is removed when the utility trailer is in the lowered or folded position. The utility trailer further includes fenders configured to protection wheel of the utility trailer, the fender configured to be removed in the lowered or folded position. The utility trailer additionally includes a swivel jack rotatably coupled to the trailer frame. The swivel jack includes a cross support coupled between the trailer frame and including a cutout. The swivel jack also includes a swivel bracket coupled with the trailer frame and the cross support and including a rotation hole. The swivel jack further includes a rotation pin inserted into the rotation hole to freely rotate. The swivel jack additionally includes a jack stand inserted around the rotation pin and configured to rotate between a folded position where the jack stand is horizontal and a part of the jack stand is inserted into the cutout of the cross support and an unfolded position where the jack stand is vertical.

Other technical features may be readily apparent to one skilled in the art from the following figures, descriptions, and claims.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1A through 6, described below, and the various embodiments used to describe the principles of the present disclosure are by way of illustration only and should not be construed in any way to limit the scope of the disclosure. Those skilled in the art will understand that the principles of the present disclosure may be implemented in any type of suitably arranged device or system.

In the present disclosure, siderails, the front rail, and the rear gate/ramp on a utility trailer are foldable inward onto the deck (or deck frame), with the siderails folded down first into contact with the deck/frame and the front rail and rear gate/ramp then folded down on top of the folded siderails. The resulting structure is compact and suitable for stacking (with or without fenders attached), so that multiple trailers can be transported as a single load. The savings in transportation costs—particularly, for example, for manufacture in one North America Free Trade Agreement (NAFTA) country and sale in another—warrants the additional manufacturing complexity and expense. One important technical benefit to having the siderails, the front rail, and the rear gate/ramp fold down (and preferably inward) rather than be completely removable is that less "finishing" work is required by the dealer selling the trailer, requiring less time to place the trailer into the operational configuration and with less possibility for mistakes.

Figure 1A:
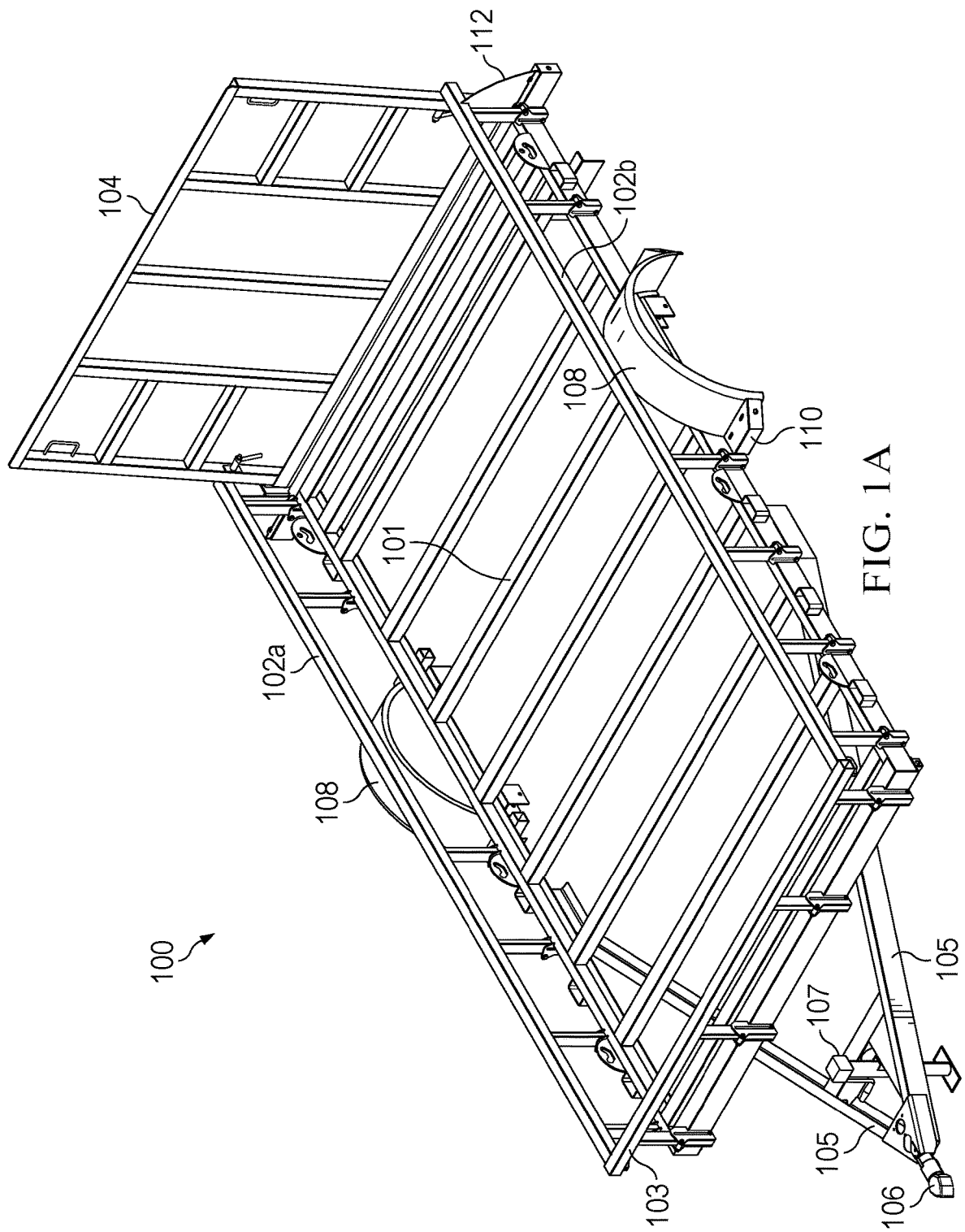
FIGS. 1A through 1G depict the structure of a utility trailer in accordance with the present disclosure, with the siderails, front rail, and rear gate/ramp all upright, as positioned during use of the trailer.
Figure 1B:
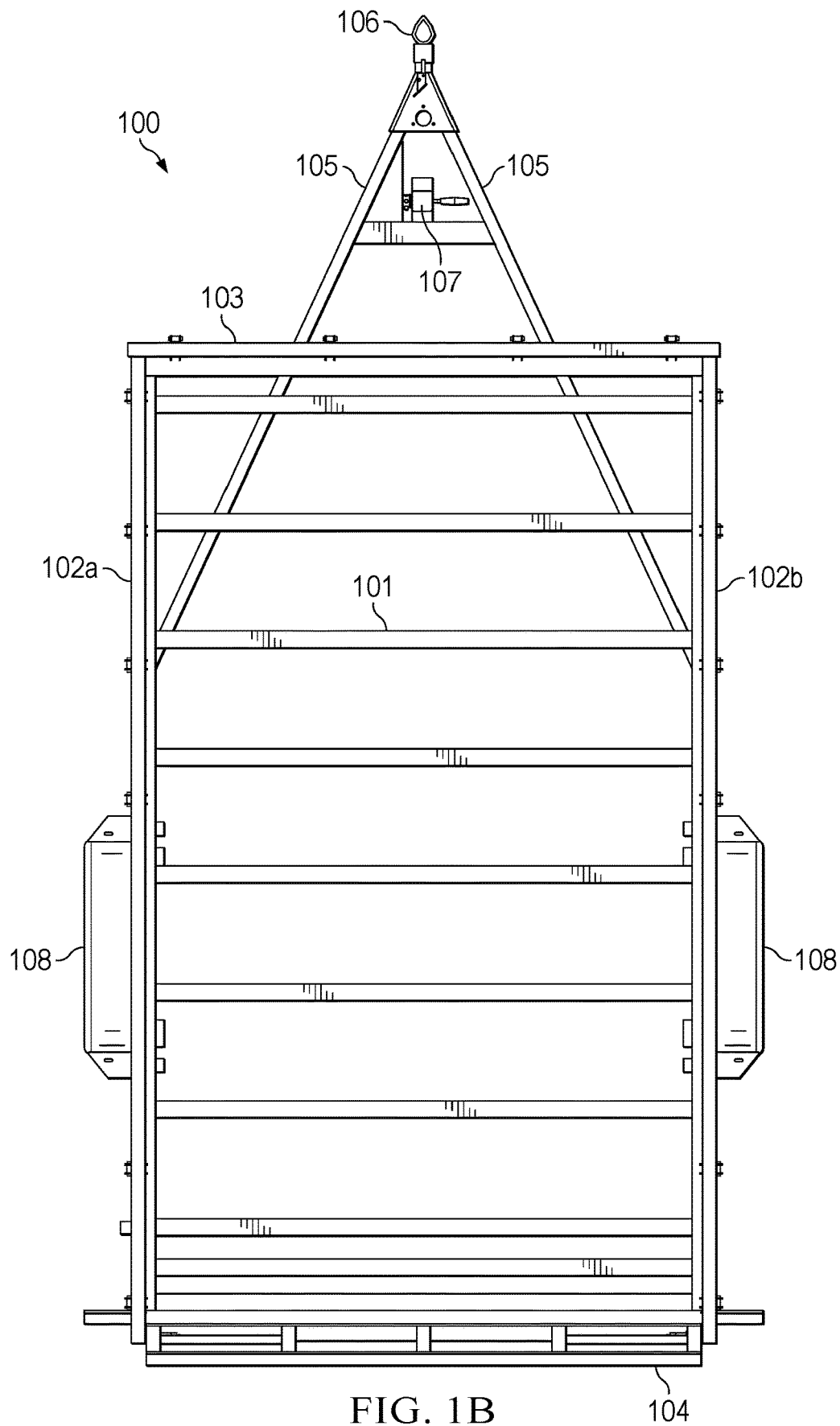
Figure 1C:
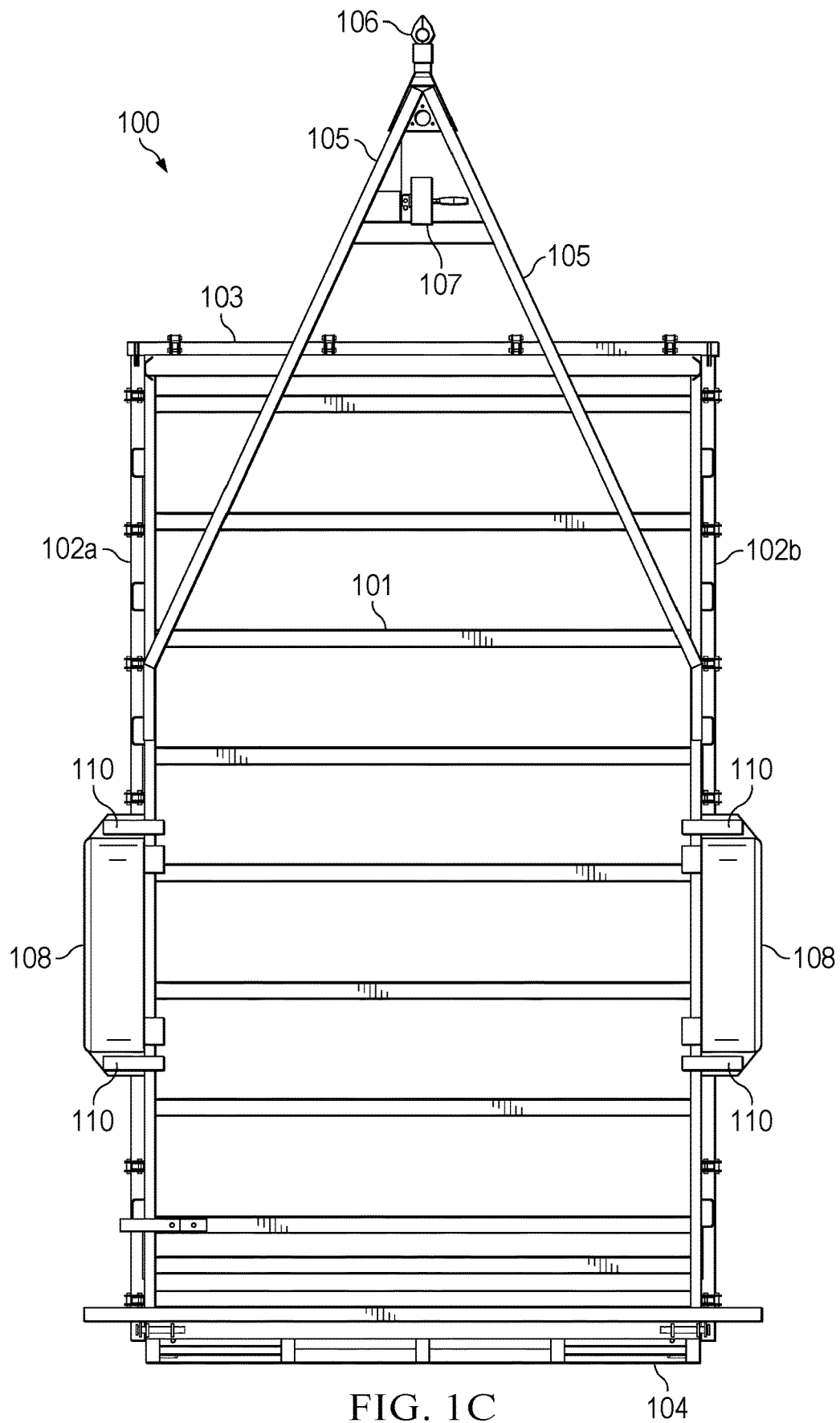
Figure 1D:
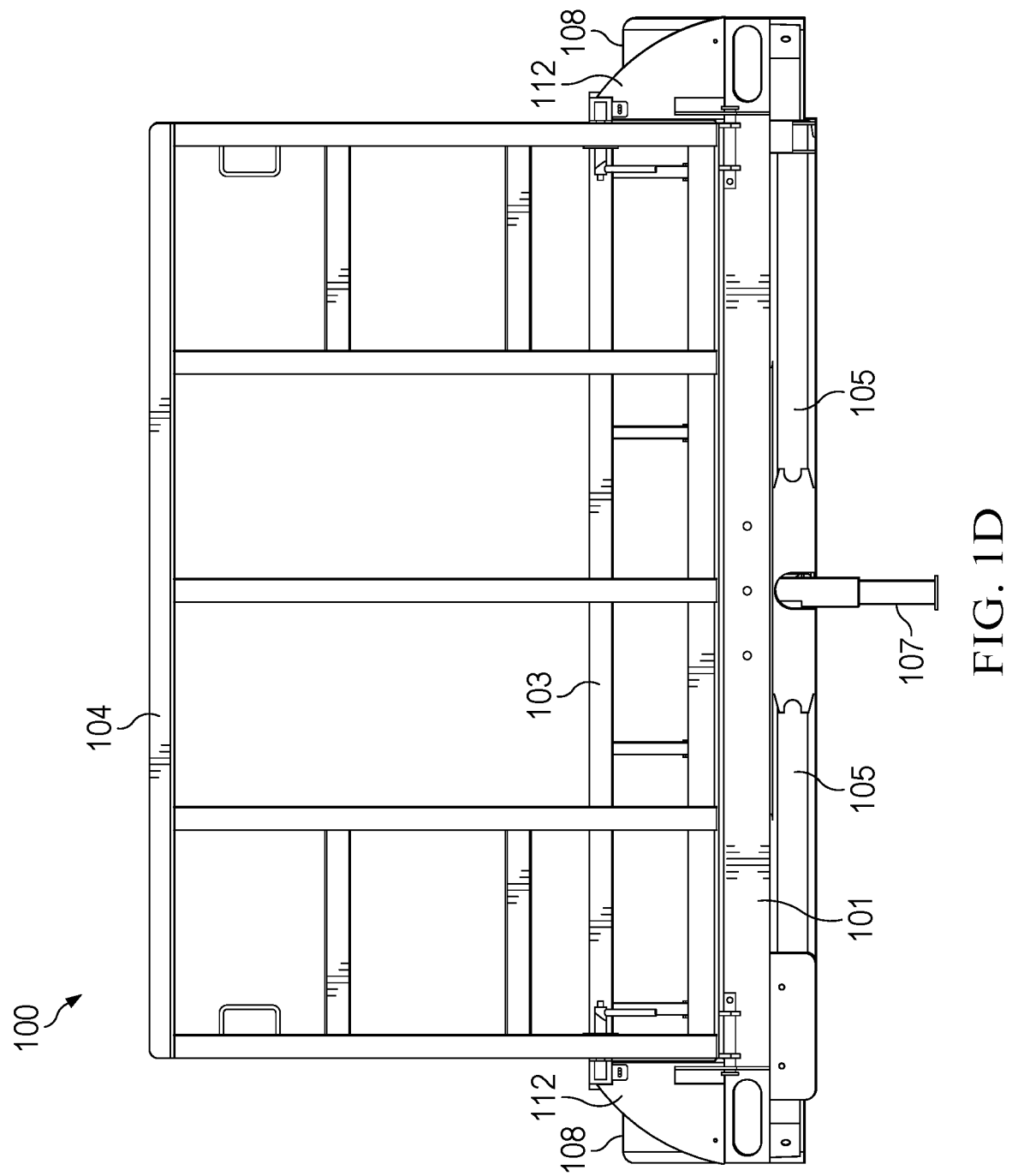
Figure 1E:
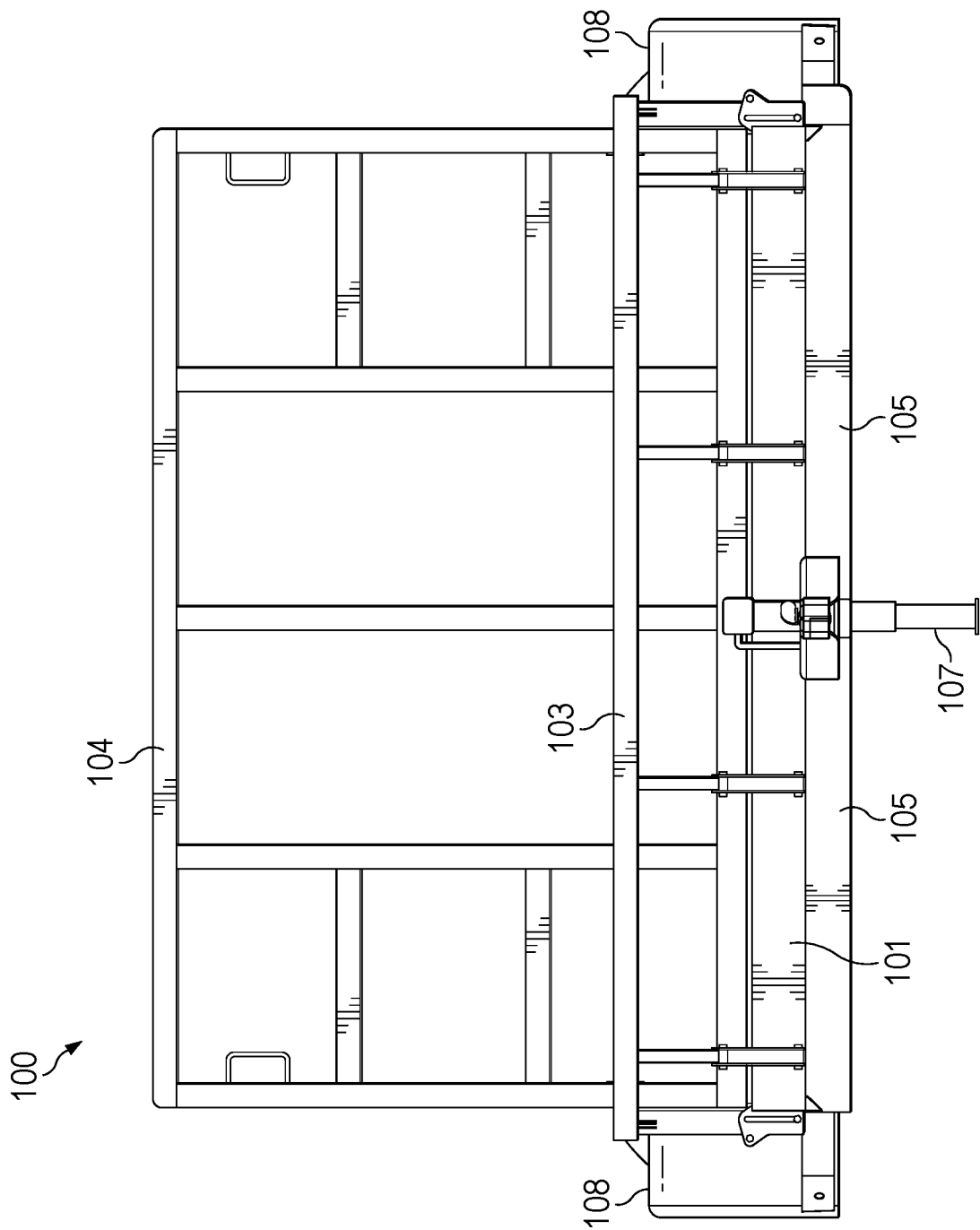
Figure 1F:
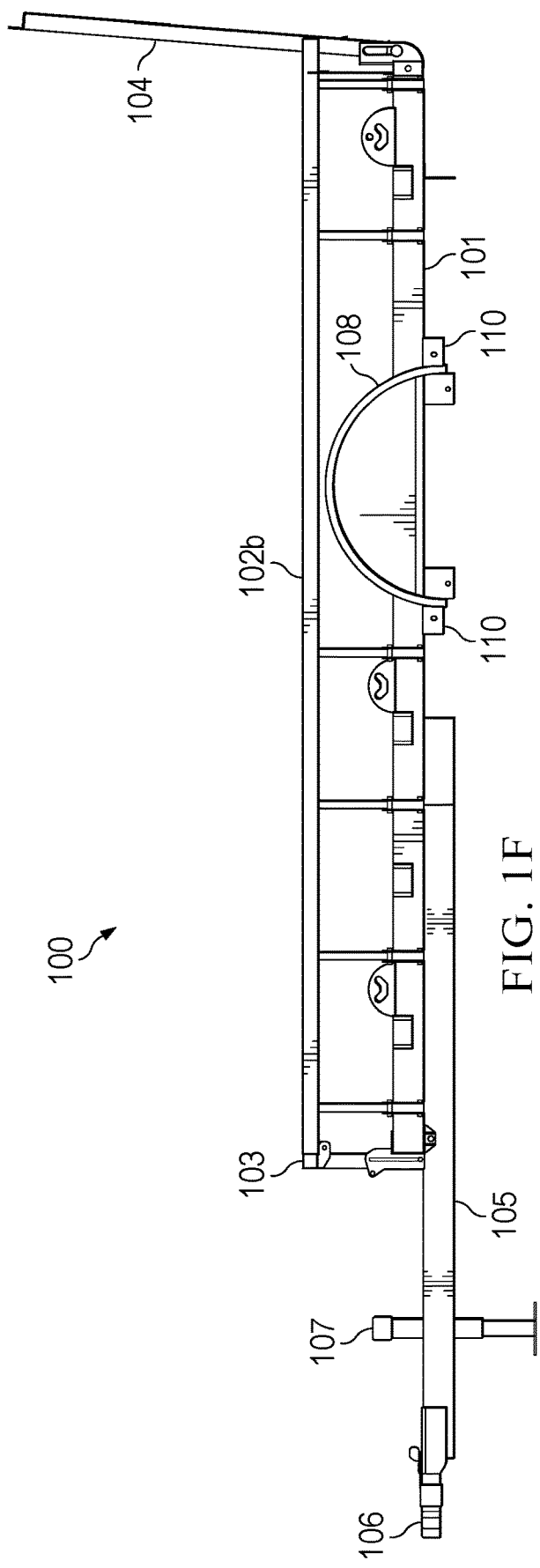
Figure 1G:
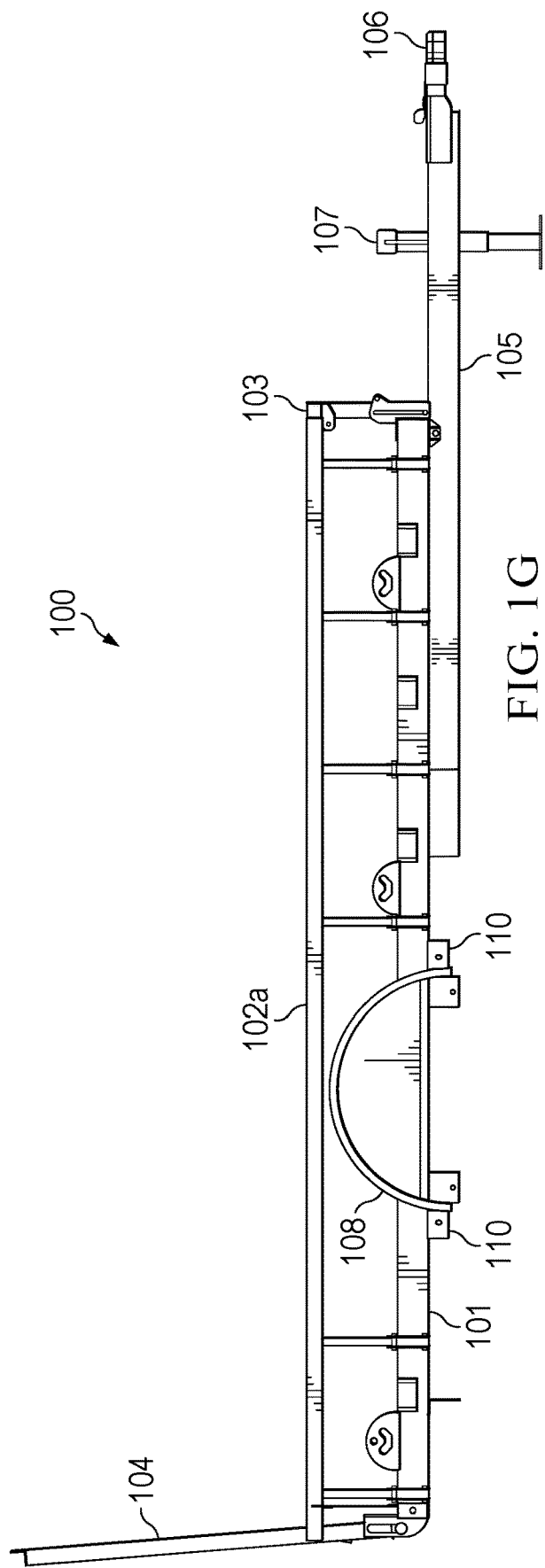

FIGS. 1A through 1G depict the structure of a utility trailer in accordance with the present disclosure, with the siderails, front rail, and rear gate/ramp all upright, as positioned during use of the trailer. As shown in FIGS. 1A through 1G, assembly of the utility trailer 100 is partially completed, without the deck surface material, axle(s) and wheels, in accordance with this disclosure. In particular, FIG. 1A is an isometric view of the utility trailer 100; FIGS. 1B and 1C are top and bottom views, respectively; FIGS. 1D and 1E are rear and front ear views, respectively; and FIGS. 1F and 1G are opposite side views. FIGS. 1A through 1G are for illustration only, and do not limit the scope of this disclosure to any particular implementation of a utility trailer. For example, while the figures depict a single axle utility trailer, the design features of the present disclosure may also be employed for a tandem axle trailer. Moreover, those skilled in the art will recognize that the full structure and operation of the utility trailer 100 is not described herein. Instead, for simplicity and clarity, only so much of the structure and function of the utility trailer as is necessary for an understanding of the present disclosure is included. For example, the exemplary embodiment includes anchors for tie-downs and other features not discussed in detail below.

As depicted in FIGS. 1A through 1G, utility trailer 100 includes a deck frame 101, which will be covered to form the load-bearing surface of the finished trailer. The deck may have a solid or mesh surface (not shown in the figures) formed of treated wood, metallic mesh, and/or any other durable material suitable for supporting equipment or the like and resisting the elements including inclement weather. Extending upright along peripheral edges of the deck frame 101 are siderails 102a, 102b and a front rail 103, each including a plurality of uprights and a horizontal crossbar in the example depicted. Siderails 102a, 102b and front rail 103 are relatively short as compared to the width of the deck, but nonetheless help retain materials on the deck during transportation and may be covered with metallic mesh or the like for that purpose. The siderails 102a, 102b may extend for a length of the deck on each side of the deck, and are attached to the deck frame 101 using a folding bracket assembly for the uprights as described in further detail below. Similarly, the front rail 103 may extend for a width of the deck, and is attached to the deck frame 101 using the folding bracket assembly described below for the uprights. The height of the siderails 102a, 102b and the front rail 103 above the deck frame 101 when upright may be relatively low (e.g., 12 inches, 14 inches, or 16 inches), although taller structures (e.g., 2 foot, 3 foot, 4 foot, or any dimension up to half the width of the deck frame 101) may alternatively be used for the siderails 102a, 102b and the front rail 103.

A rear gate/ramp 104 is connected by a hinge to a rear edge of the deck frame 101, in a manner described in further detail below. Shown in FIGS. 1A through 1G in the upright or secured position, the rear gate/ramp 104 also helps retain materials on the deck during transportation and is preferably covered with metallic mesh as shown for that purpose. Rear gate/ramp 104 may be rotated downward into a lowered or open position in which the edge opposite the hinge(s) rests on the ground, forming a ramp for loading equipment or materials onto the deck. In the present disclosure, the rear gate/ramp 104 includes spring-biased latching to the siderails when moved to the upright position, as described in further detail below.

Angled members 105 secured to the deck frame 101 (e.g., by welding) form a tongue, at the end of which is a hitch coupler 106 for connecting the utility trailer 100 to the trailer hitch on another vehicle (not shown) for towing. A front jack 107 is mounted between the angled members 105 and may be lowered to support the front end of utility trailer 100 when not connected to a vehicle trailer hitch, and raised during transportation of the utility trailer 100. In the present disclosure, the front jack 107 is rotatably mounted to the trailer tongue as described in further detail below. In FIGS. 1A through 1G, the front jack 107 is depicted in the deployed position.

Utility trailer 100 also includes fenders 108 secured to edges of the deck frame 101 in alignment with the mounts for an axle (not shown). The fenders 108 may be (for example) bolted to an edge rail for the deck frame 101. In addition, or in lieu thereof, mounts may be provided on the deck frame 101, to which fenders 108 are (also) secured. In the exemplary embodiment, as best seen in FIGS. IF and 1G, protruding mounts 110 are secured (e.g., welded) to the deck frame 101 for attachment of fenders 108 by bolts, in addition to bolting the fenders 108 to an edge rail of the deck frame 101. As discussed in further detail below, the fenders 108 are preferably, but not necessarily, left off the utility trailer 100 during stacking for transport, and are mounted on the trailer at the point of sale or use. A gusset 112 is mounted on each end of the rear bumper of the deck frame 101, to provide extra support for the top rail of siderails 102a, 102b as discussed in further detail below.

Figure 2:
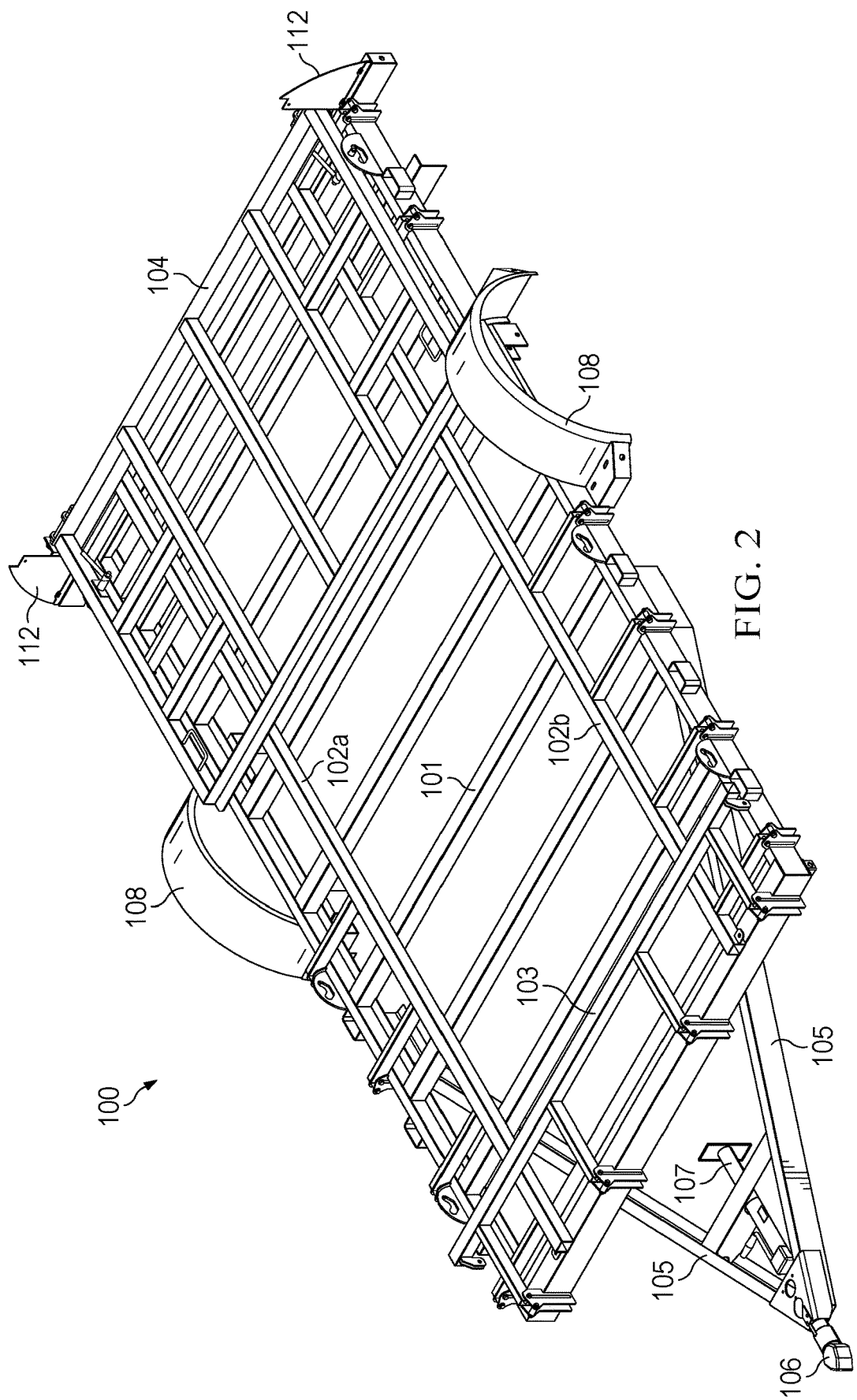
FIG. 2 is an isometric view of utility trailer of FIGS. 1A through 1G, with the siderails, front rail, and rear gate/ramp all folded down inwardly, as positioned during transport of the trailer for sale.

FIG. 2 is an isometric view of utility trailer of FIGS. 1A through 1G, with the siderails, front rail, and rear gate/ramp all folded down inwardly, as positioned during transport of the trailer for sale. In the configuration shown in FIG. 2, multiple utility trailers may be stacked (for example, on the flatbed trailer of a semi truck) for concurrent delivery. Manufacturing of the utility trailers had been completed to the point shown, with all parts fabricated and with all necessary welding and painting completed. The remaining assembly merely involves installing the deck surface material, mounting of the axles and wheels, and optionally attaching the fenders (shown attached in FIG. 2). Those components (deck surface material, axles and wheels, and optionally the fenders) may be compactly transported together with the structure shown in FIG. 2 for each utility trailer, for assembly with the structure shown at the point of sale or use.

As discussed above, the siderails 102, 102b are configured to fold down and over on top of the deck frame 101 or the deck surface material thereon. While the deck surface material is not shown, the siderails 102a, 102b can accommodate that material when folding down, and will rest on top of the deck surface material rather than on the deck frame 101 as shown. The front rail 103 and the rear gate/ramp 104 are configured to fold down and over on top of the folded siderails 102a, 102b. The front jack 107 is rotated to the stowed position. This compact form allows for stacking. Depending on the design, the fenders 108 may be left off, to be separately stacked for transport, or, if the fender design allows for stacking with the fenders attached, affixed to the deck frame 101 and stack with the remainder of the structure.

Figure 3A:
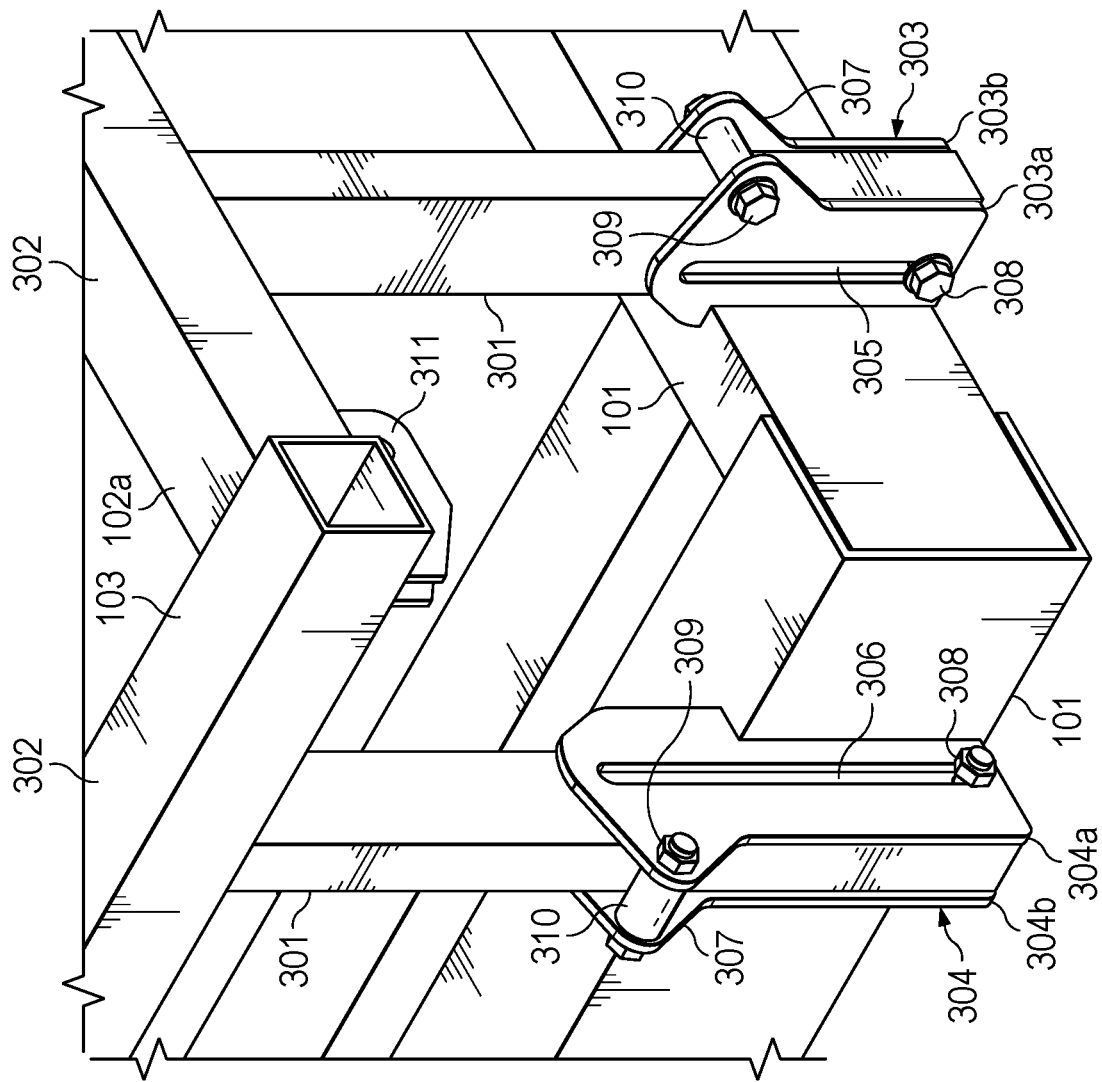
FIGS. 3A and 3B illustrate mounting of the siderails and front rail to the deck frame of the utility trailer of FIGS. 1A through 1G.
Figure 3B:
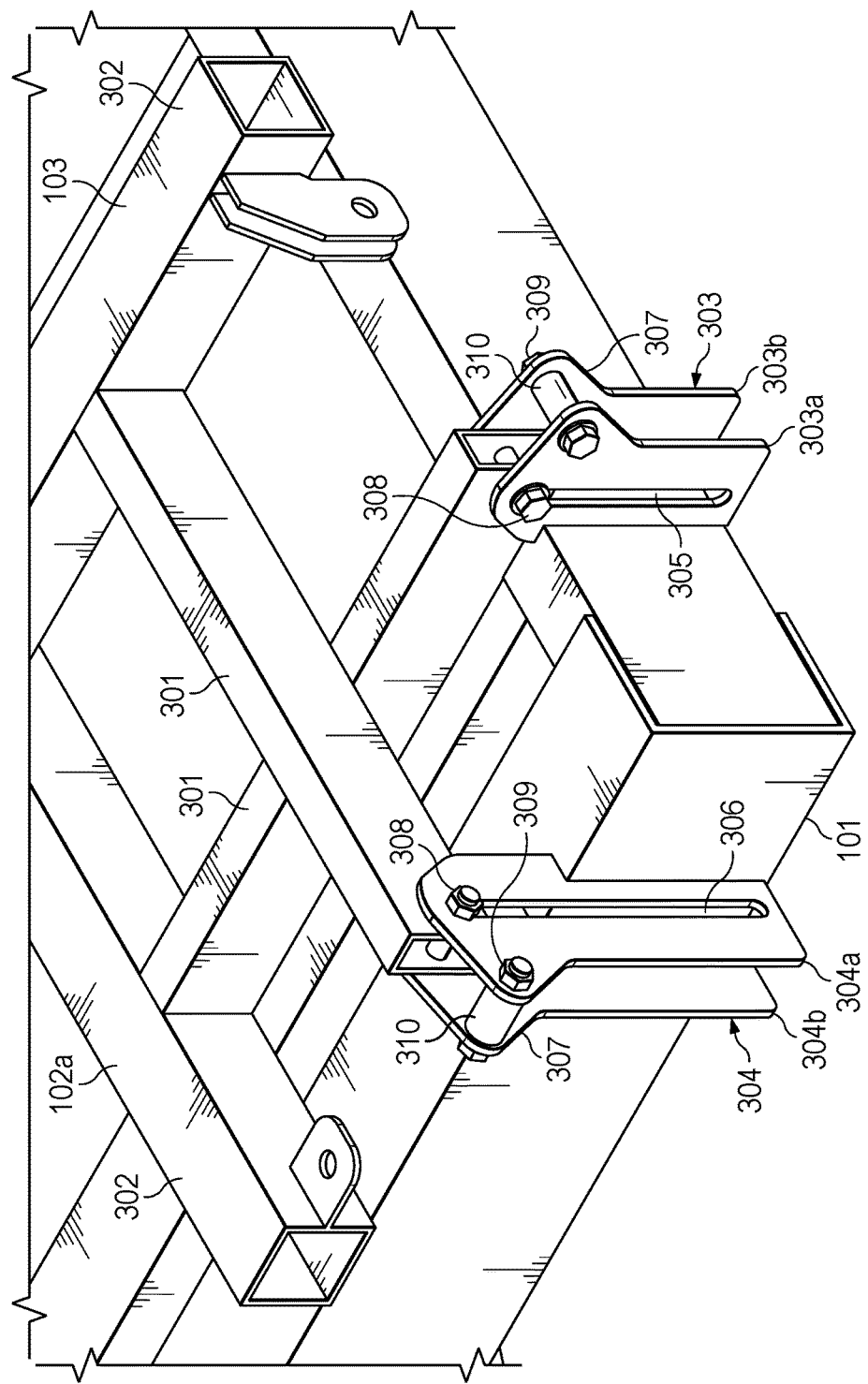

FIGS. 3A and 3B illustrate mounting of the siderails and front rail to the deck frame of the utility trailer of FIGS. 1A through 1G. As noted above, each of siderails 102a, 102b and front rail 103 is formed from uprights 301 and horizontal rails 302. The uprights 301 are each received in a respective "pocket" 303, 304. Each pocket 303, 304 is formed by two parallel plates 303a/303b, 304a/304b affixed (e.g., welded) to the deck frame 101, spaced to hold the corresponding upright 301 therebetween. Each plate 303a, 303b, 304a, 304b includes a vertical slot 305 or 306 near the edge affixed to the deck frame 101 and a protrusion 307 on the opposite edge near the top. The slots 305 and 306 receive a guide bolt assembly 308 (bolt, washer(s) and nut) that extends through a hole extending, near the bottom of the respective upright 301, through that upright 301, and through the slots of both plates 303a/303b or 304a/304b. The use of guide bolt assemblies 308 potentially allows siderails 102a, 102b and front rail 103 to be removed from the trailer 101, if the nut is removable from the bolt. However, the nut for guide bolt assemblies 308 need not be removable, but may instead be made non-removable (e.g., by modifying the end of the bolt after the nut is threaded thereon) or become non-removable (e.g., a free spin non-reversing locknut, a breakaway nut, etc.) after being tightened. Moreover, a welded pin or the like, or a removable pin, may be used in place of guide bolt assemblies 308. Each protrusion 307 has a hole therethrough to receive a locking bolt assembly 309 (again, bolt, washer(s) and nut) with a bushing 310 between the plates, outside of the corresponding upright 301. The slots 305, 306 and guide bolt assemblies 308 allow the upright 301 to move up and down within the pocket 303, 304, while the locking bolt assemblies 309 and bushings 310 retain the upright 301 between the plates—that is, prevent the upright from rotating outward, relative to the deck frame 101. As with the nut for guide bolt assemblies 308, the nut for the locking bolt assemblies 309 need not be removable, but may instead be made non-removable or become non-removable after being tightened The guide bolt assemblies 308 and the locking bolt assemblies 309 and bushings 310 do not need to be removed or fully disassembled to move the siderails 102a, 102b and front rail 103 from the upright position to the folded position. The guide bolt assemblies 308 extend through a hole near the bottom of the upright 301, as shown in FIG. 3B, and, when loosened, move within the slots 305, 306 of the pocket 303, 304. If permitted by the locking bolt assemblies 309 and bushings 310 (i.e., those assemblies have also been loosened), the upright 301 may be moved up and down within the pocket 303, 304, with the limits permitted by the corresponding slot 305, 306. Once the upright 301 is moved to the upward limit of vertical movement, the bottom edge of the upright 301 clears the bushing 301 and the upright 301 can be rotated over the deck frame 101. Because the front rail 103 folds over on top of the siderails 102a, 102b, the slot 306 in the pocket 304 for each upright 301 of the front rail 103 must be longer than the slot 305 in the pocket 303 for each upright 301 of one of the siderails 102a, 102b.

To secure the upright vertically, the locking bolt assemblies 309 are preferably "self-locking," securing the uprights in position within the respective pockets automatically upon tightening. For example, with the locking bolt assemblies 309 of the exemplary embodiment, the hole through each bushing 310 is off-center relative to the diameter of the bushing 310. The bolt of the locking bolt assembly 309 extends through that hole and, when the bolt or nut of the locking bolt assembly 309 is tightened, the bushing 301 is naturally rotated by such tightening into compression against the upright 301, effectively securing or locking the upright against movement within the pocket. In addition, two mechanisms depicted in FIG. 3A further secure the upright 301 against movement within the respective pocket when in the upright position: First, a catch 311 extends from an end of the horizontal rail 302 for the siderail 102a under the bottom of the horizontal rail 302 for the front rail 103. Second, the guide bolt assembly 308 for the uprights 301 of the front rail 103 may be moved from the holes near the bottom of the upright to extend through holes through the uprights 301 aligned near the top of the slot 306, when the upright 301 is vertical. This need not be done for all uprights 301 of the front rail 103, but instead may be done only for the endmost uprights 301. When positioned as shown in FIG. 3A, the guide bolts assembly 308 through the slot 306 and upright 301 inhibits upward vertical movement of the front rail 103, which in turn inhibits upward vertical movement of the siderail 102a due to catch 311.

Figure 4A:
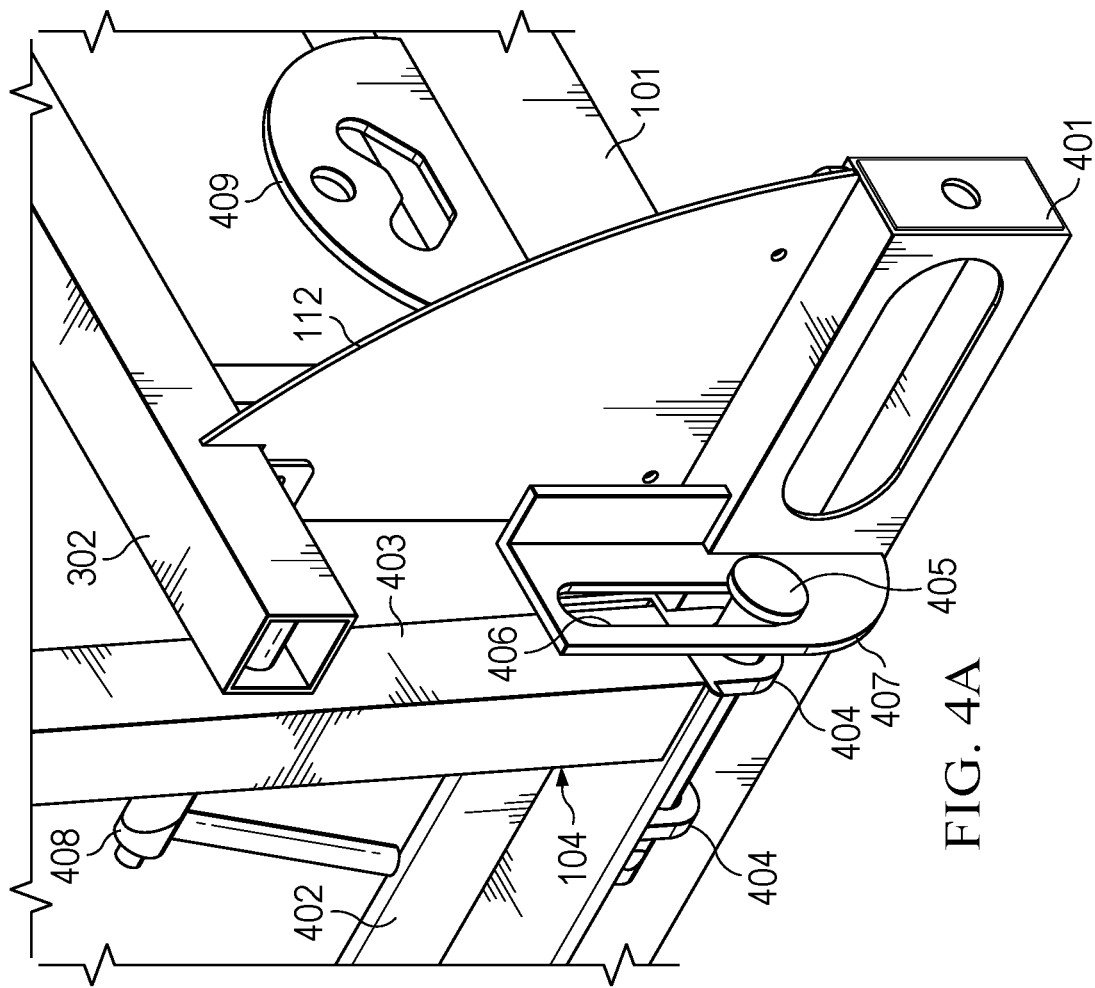
FIGS. 4A and 4B illustrate mounting of the rear gate/ramp to the deck frame of the utility trailer of FIGS. 1A through 1G.
Figure 4B:
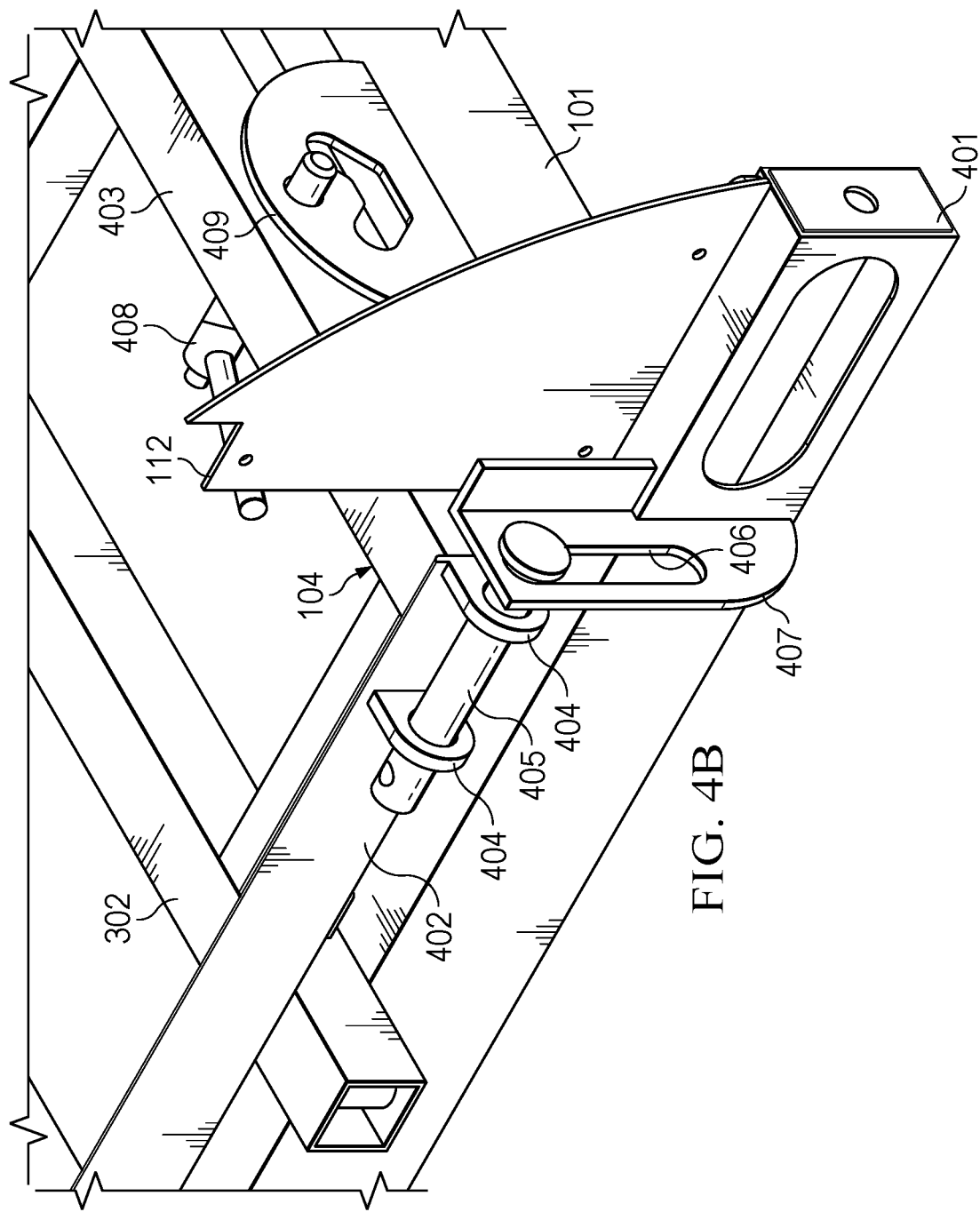

FIGS. 4A and 4B illustrate mounting of the rear gate/ramp to the deck frame of the utility trailer of FIGS. 1A through 1G. The rear gate/ramp 104 is mounted to a rear bumper 401 portion of the deck frame 101. The rear gate/ramp 104 includes a hinge mount 402 extending a width thereof at the end mounted to the deck frame 101 and edge supports 403 along either side, where only one edge support 403 is visible in the detail of FIGS. 4A and 4B. Eyelet brackets 404 protrude from the hinge mount 402 at either side of the rear gate/ramp 104. A hinge pin 405 extends through the eyelet brackets 404 and through a slot 406 in a hinge mount bracket 407 affixed (e.g., welded) to the rear bumper 401. While the hinge mechanism on only one corner of the rear gate/ramp 104 is shown in FIGS. 4A and 4B, those skilled in the art will recognize that a mirror-image hinge mechanism is provided on the opposite corner.

Hinge pin 405 freely rotates within the slot 406 of the hinge mount bracket 407, allowing the rear gate/ramp 104 to rotate downward and outward (relative to the deck frame 101) to be lowered from the upright position shown in FIG. 4A to rest on the ground, forming a ramp as described above. Movement of the hinge pin 405 within the slot 406 of the hinge mount bracket 407 also allows the rear gate/ramp 104 to be lifted up and rotated downward and inward (again, relative to the deck frame 101) to a stowed position, resting on top of the folded siderails 102a, 102b as shown in FIGS. 2 and 4B. Each hinge pin 405 includes a head at one end of a shaft, where the shaft fits through the slot 406 but the head does not, and a hole at the other end for receiving a cotter pin, safety pin, or the like.

A spring-biased latch 408 is provided on each edge support 403 to secure the rear gate/ramp 104 in the upright position shown in FIG. 4A or the stowed position shown in FIG. 4B. Each latch 408 includes a handle and a spring-biased shaft extending through a hole through the edge support 403. In the upright position of the rear gate/ramp 104 shown in FIG. 4A, the end of the shaft protruding through the edge support 403 is received by a hole in the horizontal rail 302 of the siderail adjacent that side of the rear gate/ramp 104. In the stowed position of the rear gate/ramp 104 shown in FIG. 4B, the end of the shaft protruding through the edge support 403 is received by a hole in a tie-down anchor 409 on the deck frame 101. Release of the spring-biased latch 408 is effected by pulling on the handle thereof against the biasing force of the spring, until the end of the shaft clears the hole in the horizontal rail 302 or tie-down anchor 409.

As best seen in FIG. 4A, the gusset 112 mounted on the rear bumper 401 portion of the deck frame 101 at each end thereof includes an inset for receiving the horizontal rail 302 of the siderail 102a or 102b on the respective side of the deck frame 101. The gusset 112 provides extra support for the siderail 102a or 102b, and by blocking the horizontal rail 302 from moving outward too far, inhibits outward movement of the siderail 102a or 102b. This reduces the likelihood that the pin portion of the spring-biased latch 408 will be inadvertently pulled out of the hole in the horizontal rail 302 (e.g., due to momentum and/or jarring during use of the trailer 100 to transport articles). If the pin portion of the spring-biased latch 408 "pops out" of the corresponding hole in the horizontal rail 302 on either or both sides, the rear gate/ramp 104 could unintentionally fall open.

Figure 5A:
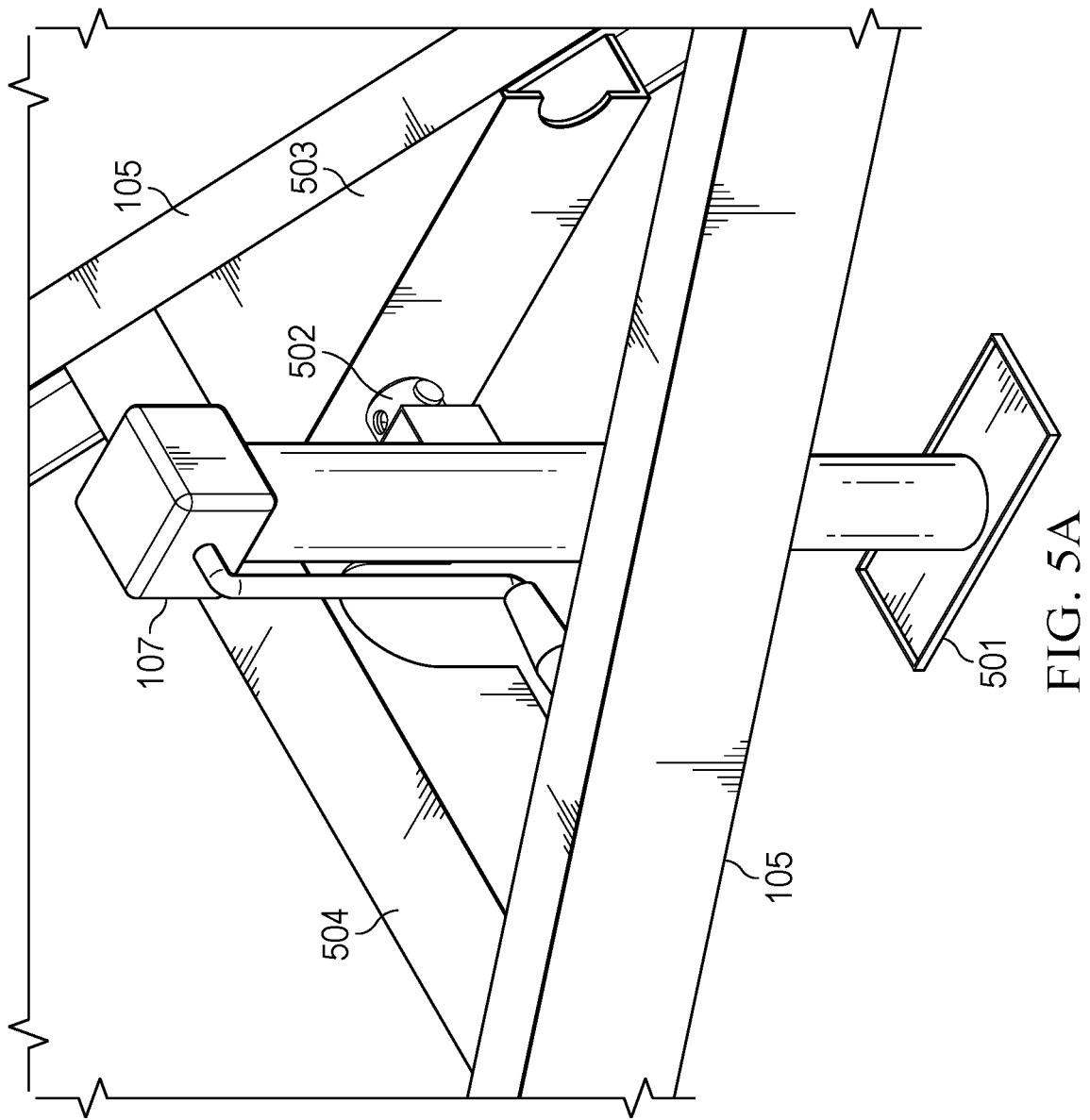
FIGS. 5A and 5B illustrate mounting of the front jack to the tongue of the utility trailer of FIGS. 1A through 1G.
Figure 5B:
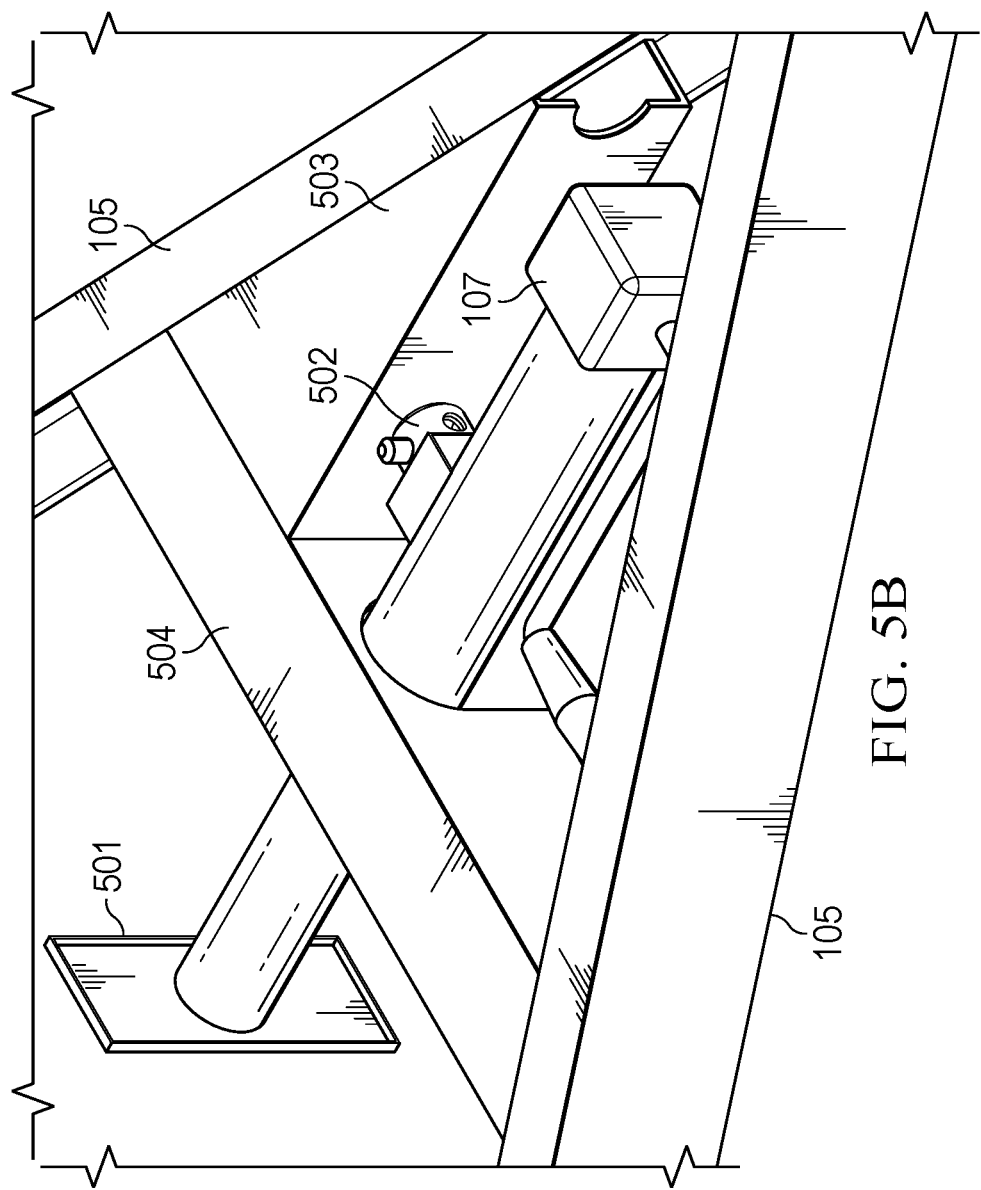

FIGS. 5A and 5B illustrate mounting of the front jack to the tongue of the utility trailer of FIGS. 1A through 1G. As described above, the front jack 107 is mounted between the angled members 105 forming the tongue of the trailer. The front jack 107 in the present disclosure is a swivel jack rotatable between a deployed position for when the utility trailer 100 is not being used and a stowed position for when the utility trailer 100 is being used or transported. The front jack 107 is used to support a front end of the utility trailer 100 when the utility trailer is not attached to a trailer hitch (i.e., is not being used). As shown in FIGS. 5A and 5B, the angled members 105 can be coupled to a bottom side of the deck frame 101. The front jack 107 includes and extendable jack stand 501, a rotating swivel mount 502, and a jack bracket 503. The jack bracket 503 can be mounted to one angled member 105 and a crossbar 504 of the trailer tongue. The jack bracket 503 can include a hole receiving one end of the rotating swivel mount 502, which rotates within the hole of the jack bracket 503.

The other end of the rotating swivel mount 502 is inserted into the shaft of the jack stand 501 in order for the jack stand to rotate freely. The jack stand 501 can be positioned in the upright or deployed position as shown in FIG. 5A when the utility trailer 100 is not in use. The jack stand 501 can be positioned in the stowed position shown in FIG. 5B when the utility trailer 100 is being used or stacked for transportation. The shaft of the jack stand 501 is received by a cutout within the crossbar 504 when rotated into in the stowed position.

Figure 6:
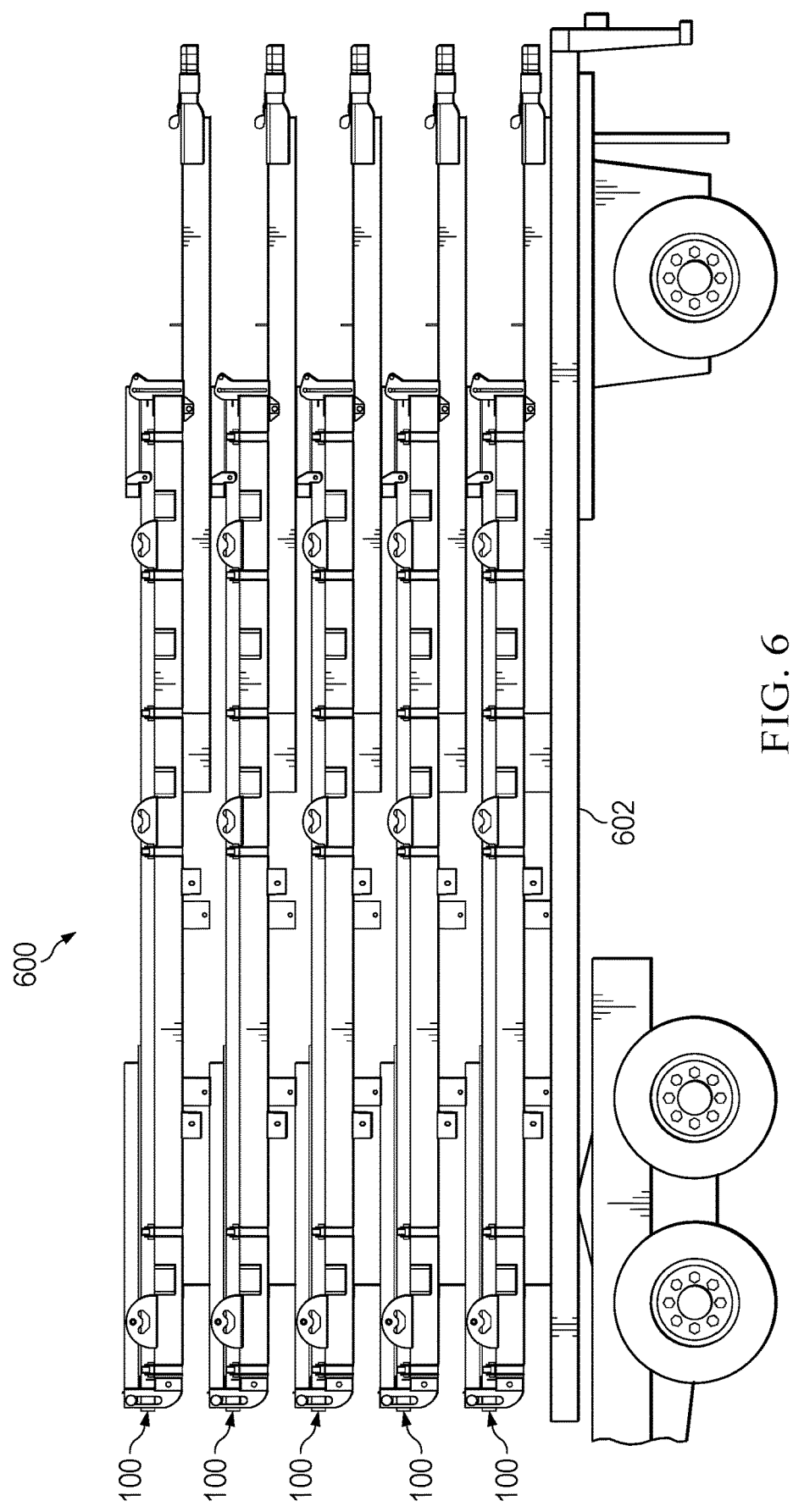
FIG. 6 illustrates an example stack of utility trailers on a flatbed in accordance with this disclosure.

FIG. 6 illustrates an example stack of utility trailers on a flatbed in accordance with this disclosure. In the configuration shown in FIG. 2, the utility trailer 100 can be stacked on another utility trailer 100, and have one or more additional utility trailers 100 stacked on top of it, to form the stack 600 illustrated in FIG. 6. As apparent from FIG. 6, a number of utility trailers 100 with the siderails 102a, 102b, front rail 103, and rear gate/ramp 104 all folded down as shown in FIG. 2 can be stacked more compactly than would be possible with the siderails 102a, 102b, front rail 103, and rear gate/ramp 104 in the upright or raised position as shown in FIG. 1A. The configuration of FIG. 2 allows a bottom side of a deck frame of an upper utility trailer 100 to lie flat on a top side of the folded siderails 102a, 102b, front rail 103 and rear gate/ramp 104 of a lower utility trailer 100. In the example shown, the fenders 108 are not mounted to the deck frame 101 configured for delivery, although with certain designs the presence of the fenders will not significantly complicate stacking of the utility trailers 100.

A utility trailer includes a deck frame and a trailer frame coupled to a bottom side of the deck frame, the trailer frame configured to couple the deck frame to a trailer hitch. The utility trailer also includes two side frames, each side frame extending along a respective side of the deck frame and a plurality of side frame rotating assemblies coupling the side frames to the respective sides of the deck frame. Each side frame rotating assembly includes side brackets coupled to a side of the deck frame and including a vertical slot and a protrusion with a hole. Each side frame rotating assembly also includes a rotation pin positioned through a post of the side frame and verticals slots in adjacent side brackets, wherein the rotation pin is located at a bottom end of the vertical hole when the side frame is in an upright and unfolded position and the rotation pin is located at a top end of the vertical slot when the side frame can be rotated in a lowered or folded position. Each side frame rotating assembly further includes an off-centered spacer with a through hole offset from a central axis of the off-centered spacer, the off-centered spacer positioned around a bolt through the holes of the adjacent side brackets. The utility trailer further includes a front frame extending along a front side of the deck frame and a plurality of front frame rotating assemblies coupling the front frame to the front side of the deck frame. Each front frame rotating assembly includes front brackets coupled to the front side of the deck frame and including a vertical slot and a protrusion with a hole. Each front frame rotating assembly also includes a rotation pin positioned through a post of the front frame and verticals slots in adjacent front brackets, wherein the rotation pin is located at a bottom end of the vertical hole when the front frame is in an upright and unfolded position and the rotation pin is located at a top end of the vertical slot when the front frame can be rotated in a lowered or folded position. Each front frame rotating assembly further includes an off-centered spacer with a through hole offset from a central axis of the off-centered spacer, the off-centered spacer positioned around a bolt through the holes of the adjacent side brackets. The utility trailer additionally includes a ramp extending along a back side of the deck frame and a plurality of ramp rotation assemblies coupling the ramp to the back side of the deck frame. Each ramp rotation assembly includes a slotted bracket coupled to the deck frame and including a vertical slot. Each ramp rotation assembly also includes a rotation pin coupled to a bottom end of the ramp and inserted through the vertical slot, wherein the rotation pin is located at a bottom of the vertical slot to be in an upright or unfolded position and also for lowering the ramp to the ground for loading and unloading the utility trailer and the rotation pin is located a top of the vertical slot to be rotated to a lowered or folded position. Each ramp rotation assembly further includes a locking pin extending through a post of the ramp, the locking pin configured to be inserted into a hole of the side frame to lock the ramp in the upright or unfolded position and be inserted into a hole of a bracket coupled to a side of the deck frame. The utility trailer also includes a support panel coupled to an end of the deck frame and including a cutout configured to limit rotation of the side frame when changing to the upright or unfolded position, wherein the support panel is removed when the utility trailer is in the lowered or folded position. The utility trailer further includes fenders configured to protection wheel of the utility trailer, the fender configured to be removed in the lowered or folded position. The utility trailer additionally includes a swivel jack rotatably coupled to the trailer frame. The swivel jack includes a cross support coupled between the trailer frame and including a cutout. The swivel jack also includes a swivel bracket coupled with the trailer frame and the cross support and including a rotation hole. The swivel jack further includes a rotation pin inserted into the rotation hole to freely rotate. The swivel jack additionally includes a jack stand inserted around the rotation pin and configured to rotate between a folded position where the jack stand is horizontal and a part of the jack stand is inserted into the cutout of the cross support and an unfolded position where the jack stand is vertical.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A utility trailer, comprising:
   a deck frame;
   siderails attached to the deck frame and extending along each side of the deck frame, each siderail configured to rotate, without being detached from the deck frame, between an upright position extending away from the respective side the deck frame and a stowed position aligned with and over the deck frame;
   a front rail attached to the deck frame and extending along a front of the deck frame, the front rail configured to rotate, without being detached from the deck frame, between an upright position extending away from the deck frame and a stowed position aligned with the deck frame and over the siderails in the stowed position; and
   a rear gate/ramp attached to the deck frame and extending across a rear of the deck frame, the rear gate/ramp configured to rotate between an upright position and a lowered position having one end resting on a surface below the utility trailer, and further configured to rotate, without being detached from the deck frame, between the upright position and a stowed position aligned with the deck frame and over the siderails in the stowed position,
   wherein the siderails and the front rail each comprise a plurality of uprights and a horizontal rail, each upright of the siderails and the front rail received by a pocket on the deck frame and secured to the respective pocket by a shaft through the upright and a slot in the respective pocket, the shaft movable within the slot to allow vertical movement of the upright within the respective pocket.

2. The utility trailer of claim 1, wherein the slot in each pocket receiving an upright for the front rail is longer than the slot in each pocket receiving an upright for one of the siderails.

3. The utility trailer of claim 1, wherein each pocket comprises protrusions having a hole therethrough receiving a shaft extending between the holes external to the upright received by the respective pocket, the shaft received by an off-center bushing rotatable into compression with the upright.

4. The utility trailer of claim 1, wherein the rear gate/ramp includes at least one spring-biased latch having an end received by one of a hole within the horizontal rail of one of the siderails or a hole in an anchor on the deck frame.

5. The utility trailer of claim 1, further comprising:
   a jack rotatably mounted to a tongue secured to the deck frame, the jack rotatable between a deployed position for holding a front of the utility trailer up when the utility trailer is not in use, and a stowed position aligned with the deck frame when the utility trailer is being used or transported.

6. The utility trailer of claim 1, further comprising:
   an axle and wheels mounted to the deck frame;
   fenders secured to the deck frame and surrounding a portion of each wheel;
   deck material covering the deck frame to form a load-bearing surface;
   a tongue having a hitch coupler at one end secured to the deck frame; and
   a jack mounted to the tongue.

7. A stack of utility trailers including the utility trailer of claim 1, wherein the utility trailer comprises a first utility trailer, the siderails of the first utility trailer are in the stowed position aligned with and over the deck frame, the front rail of the first utility trailer is in the stowed position aligned with the deck frame and over the siderails in the stowed position, and the rear gate/ramp of the first utility trailer is in the stowed position aligned with the deck frame and over the siderails in the stowed position, the stack further comprising:

a second utility trailer stacked one of above or below the first utility trailer.

8. A utility trailer, comprising:

a deck frame having a plurality of siderail pockets along each of two sides of the deck frame, each siderail pocket extending above an upper surface of the deck frame and having a slot therein, each slot extending above the upper surface of the deck frame; and siderails extending along each of the two sides of the deck frame, each of the siderails rotatably attached to the deck frame and comprising a plurality of siderail uprights and at least one horizontal rail, each siderail upright received by one of the siderail pockets on the deck frame and secured to the respective siderail pocket by a shaft through the siderail upright and the slot in the respective siderail pocket, each siderail upright and corresponding shaft vertically movable within respective siderail pocket and the corresponding shaft vertically movable within the slot to allow vertical movement of the siderails and, when the shaft is at an uppermost end of the slots in the siderail pockets, rotation of the siderail over onto the deck frame.

9. The utility trailer of claim 8, further comprising:

a rear gate/ramp across a rear of the deck frame, the rear gate/ramp configured to rotate between an upright position and a lowered position having one end resting on a surface below the utility trailer and between the upright position and a stowed position aligned with and over the deck frame; and at least one spring-biased latch mounted on the rear gate/ramp, an end of the spring-biased latch received by a hole in the horizontal rail of one of the siderails when the rear gate/ramp in the upright position, wherein the end of the spring-biased latch is received by a hole in an anchor on the deck frame when the rear gate/ramp in the stowed position.

10. The utility trailer of claim 9, wherein the at least one spring-biased latch comprises a spring-biased latch mounted on each side of the rear gate/ramp.

11. The utility trailer of claim 9, further comprising:

a tongue secured to the deck frame; and a jack rotatably mounted to the tongue, the jack rotatable between a deployed position for holding a front of the utility trailer up when the utility trailer is not in use, and a stowed position aligned with the deck frame when the utility trailer is being used.

12. The utility trailer of claim 8, comprising:

a self-locking device associated with each siderail upright, the self-locking device inhibiting movement of the siderail upright within the respective siderail pocket.

13. The utility trailer of claim 12, wherein the self-locking device comprises a bolt, a nut, and a cylindrical bushing receiving the bolt in a longitudinal axial hole therethrough, the longitudinal axial hole in the bushing off center relative to an axis of the cylindrical bushing such that the cylindrical bushing is forced into compression against the upright by tightening of one of the bolt or the nut.

14. The utility trailer of claim 8, the deck frame having a plurality of front rail pockets along a front of the deck frame, each front rail pocket extending above the upper surface of the deck frame and having a slot therein, each slot in one of the front rail pockets extending further above the upper surface of the deck frame than the slots in the siderail pockets, the utility trailer further comprising:

a front rail extending along a front of the deck frame, the front rail rotatably attached to the deck frame and comprising a plurality of front rail uprights and the at least one horizontal rail, each front rail upright received by one of the front rail pockets on the deck frame and secured to the respective front rail pocket by a shaft through the front rail upright and the slot in the respective front rail pocket, each front rail upright vertically movable within respective front rail pocket and the corresponding shaft vertically movable within the slot to allow vertical movement of the front rail and, when the shaft is at an uppermost end of the slots, rotation of the front rail over the deck frame above the siderails.

* * * * *